Dec. 30, 1924.  1,520,778

H. A. STILLWELL
DRILLING APPARATUS
Filed July 12, 1916   6 Sheets-Sheet 1

Inventor
Howard A. Stillwell
By his Attorneys
Prindle, Wright & Small

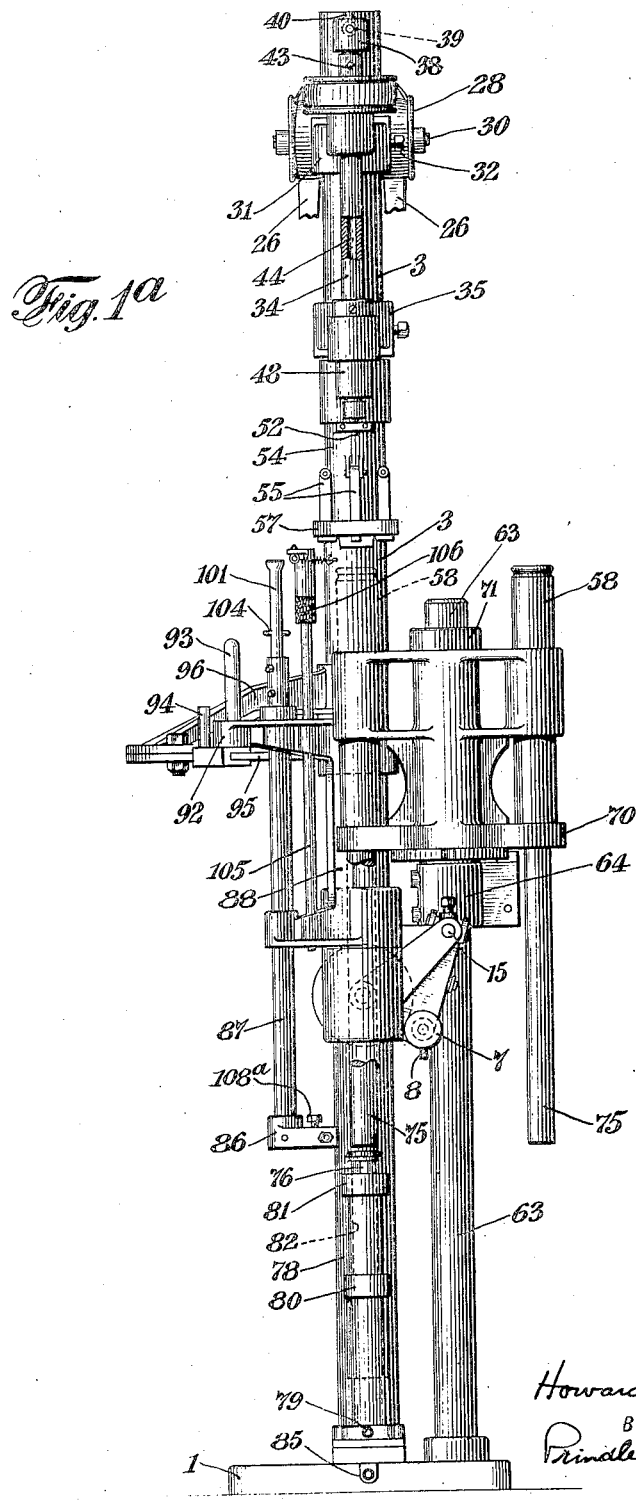

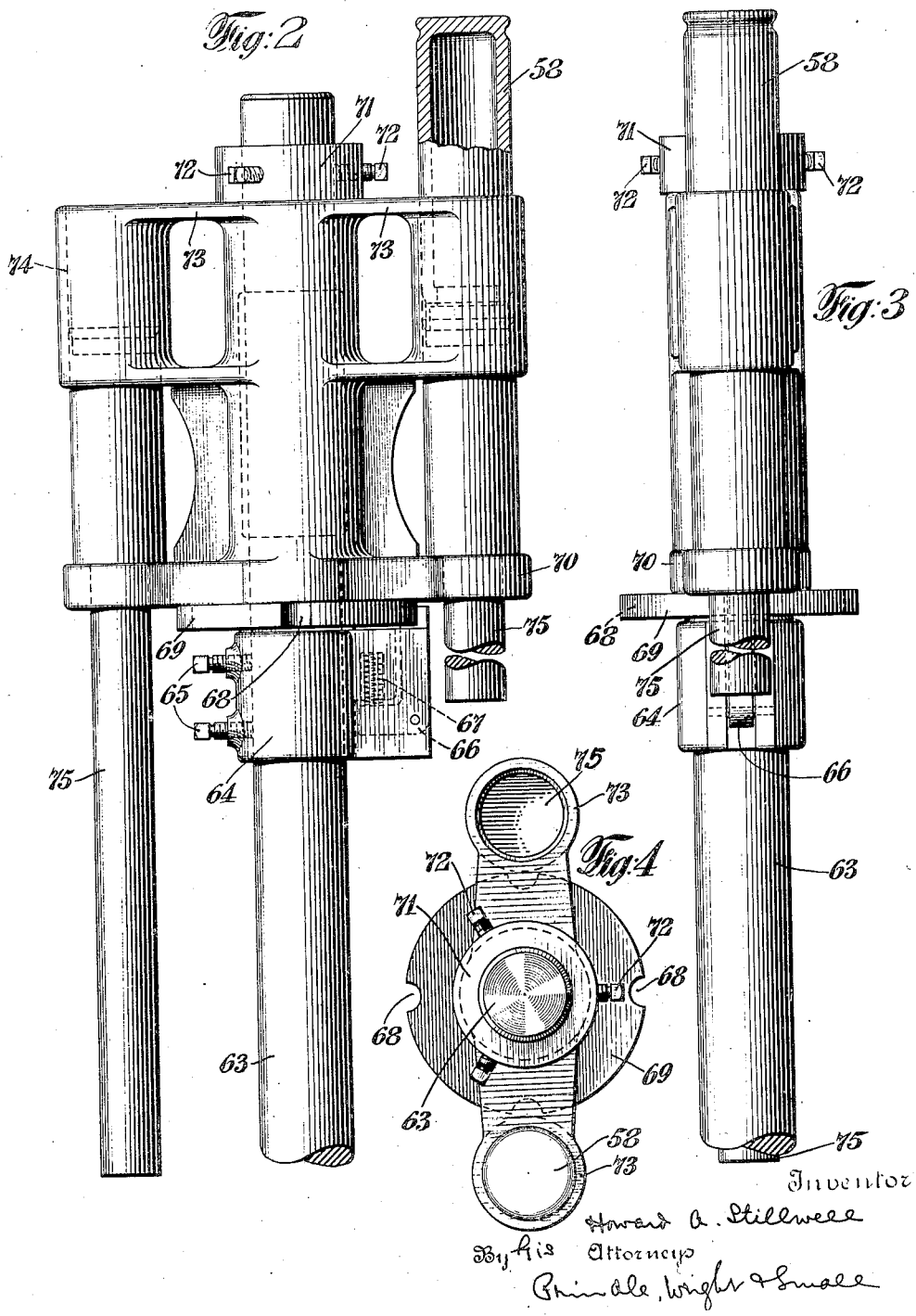

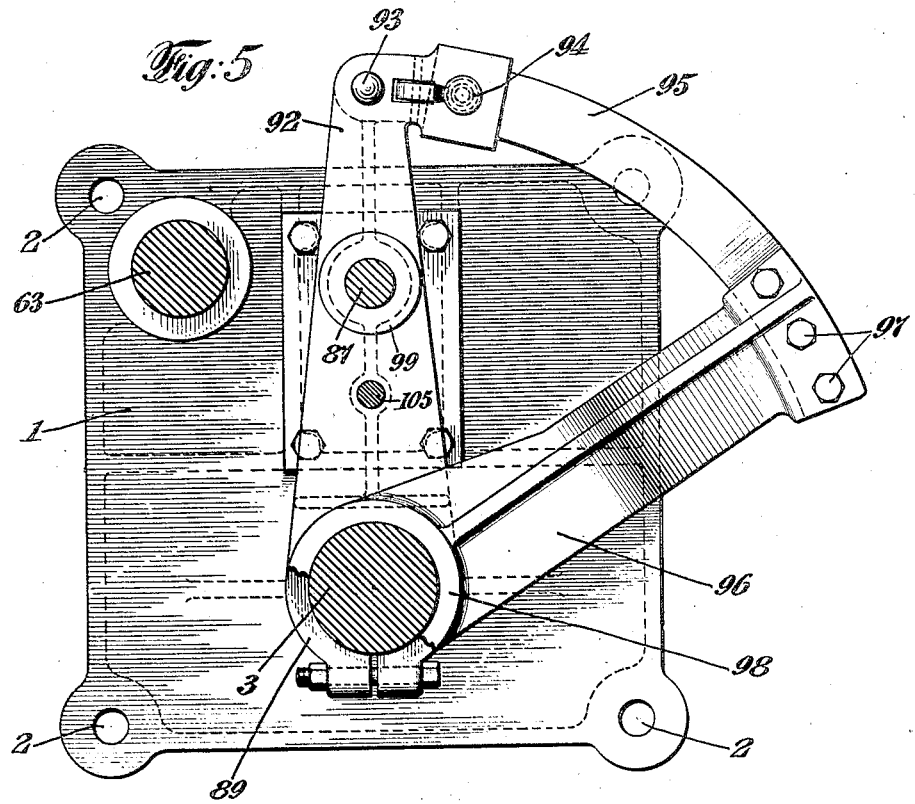
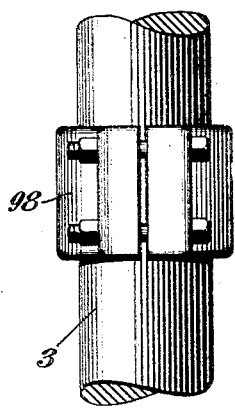
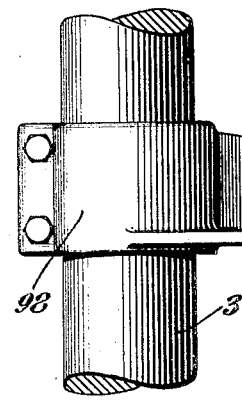
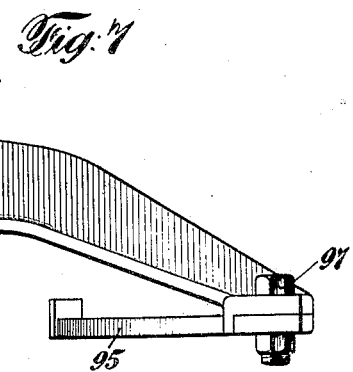

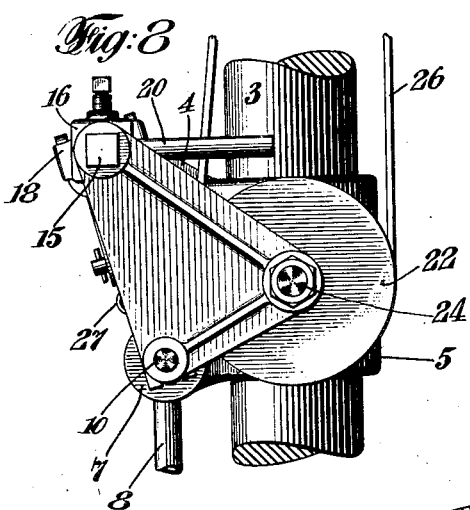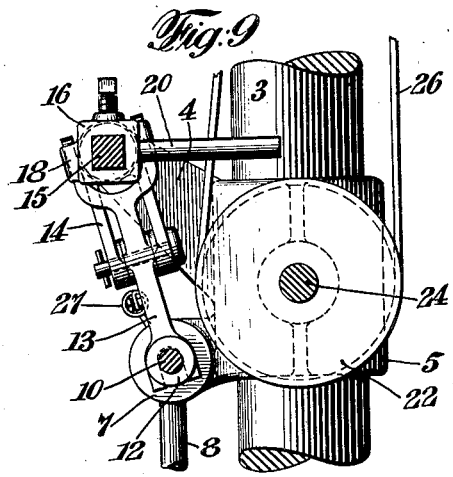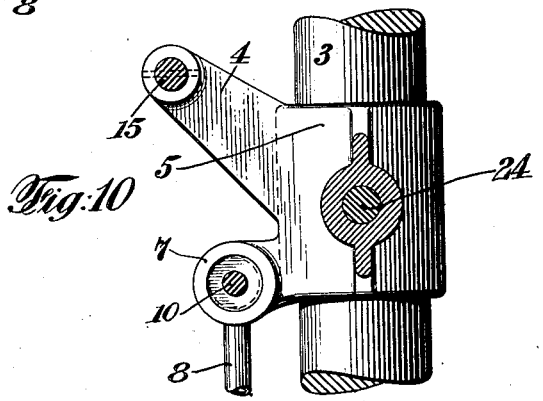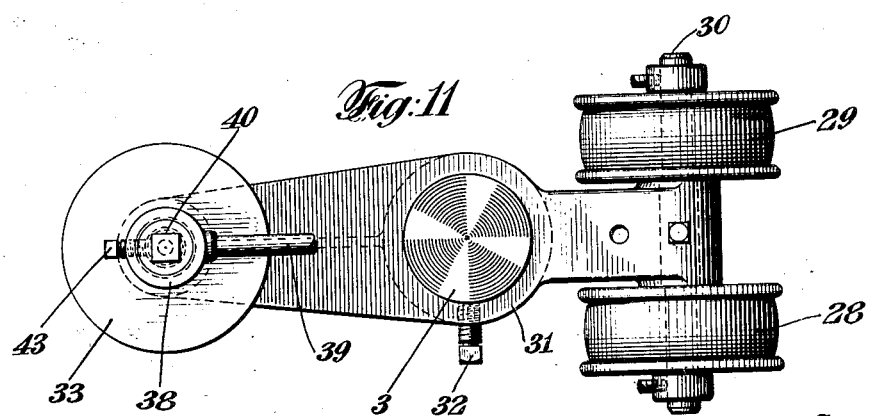

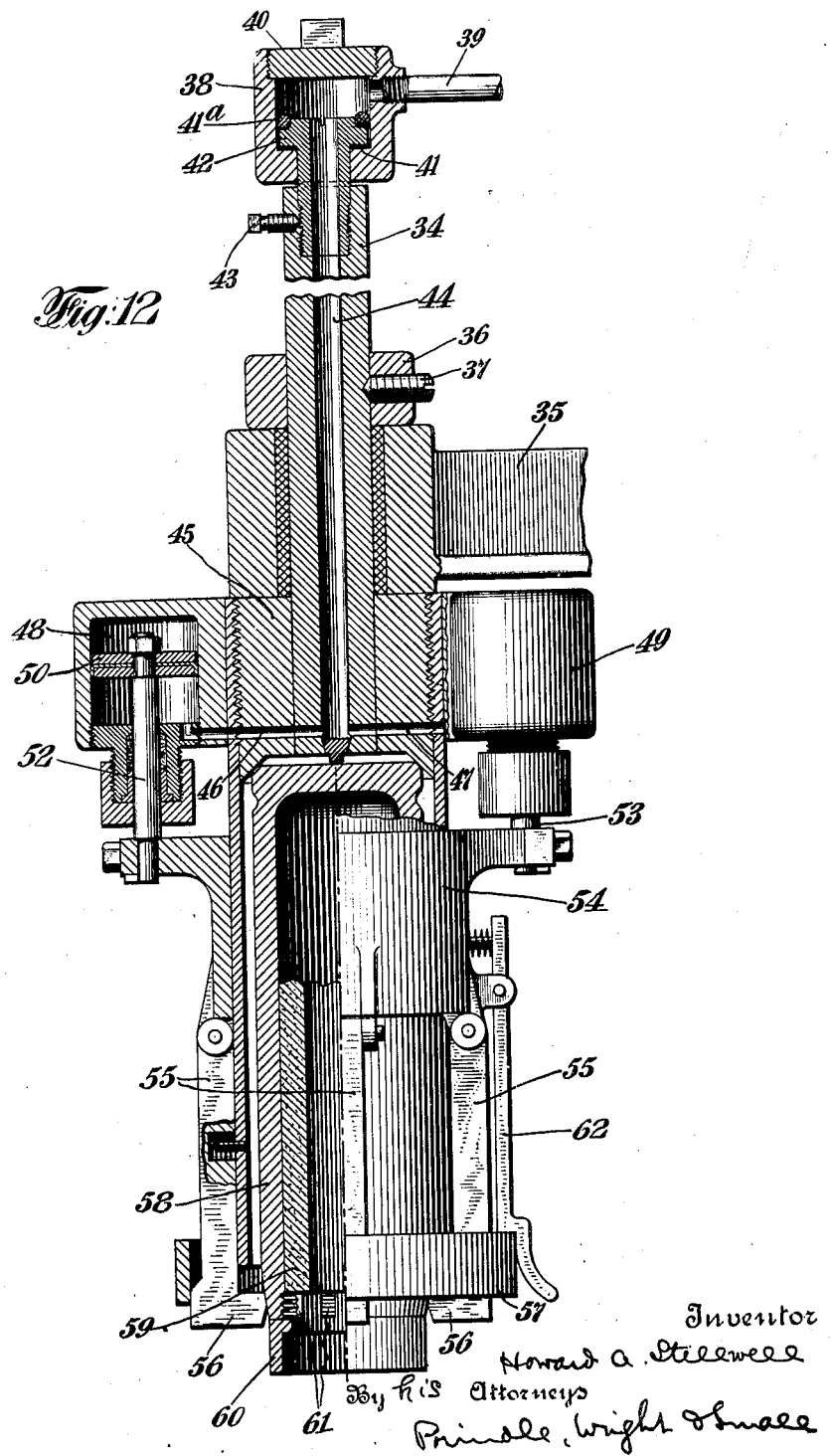

Patented Dec. 30, 1924.

1,520,778

UNITED STATES PATENT OFFICE.

HOWARD A. STILLWELL, OF WOODBURY, NEW JERSEY, ASSIGNOR TO E. I. DU PONT DE NEMOURS AND COMPANY, OF WILMINGTON, DELAWARE, A CORPORATION OF DELAWARE.

DRILLING APPARATUS.

Application filed July 12, 1916. Serial No. 108,794.

*To all whom it may concern:*

Be it known that I, HOWARD A. STILLWELL, of Woodbury, in the county of Gloucester and in the State of New Jersey, have invented a certain new and useful Improvement in Drilling Apparatus, and do hereby declare that the following is a full, clear, and exact description thereof.

My invention relates particularly to an apparatus designed for drilling holes in explosive charges contained in shells, so that primers or other charges may be inserted in said holes, although my invention is applicable to drilling for other purposes.

The object of my invention is to provide an apparatus of this character by means of which explosive charges in shells as well as other objects may be drilled in an expeditious and advantageous manner, without danger of explosion due to an accumulation of borings of the explosive material, and in such a manner that a hole of the exact desired size and shape may be produced therein. Further objects of my invention will appear from the detailed description appearing hereinafter.

While my invention is capable of embodiment in many different forms, for the purpose of illustration I have shown only one form thereof in the accompanying drawings, in which—

Figure 1 is a side elevation of an apparatus made in accordance with my invention, with some of the parts broken away, and some parts shown in section;

Fig. 1ᵃ is a front assembly view of the apparatus shown in Fig. 1;

Figure 2 is a front elevation of the parts shown as broken away in Figure 1;

Figure 3 is a side elevation of the same taken from a different angle;

Figure 4 is a plan view of the same;

Figure 5 is a horizontal section of the entire apparatus;

Figure 6 is a rear elevation of a supporting arm attached to an upright;

Figure 7 is a side elevation of the same;

Figure 8 is a side elevation showing the belt shifting apparatus;

Figure 9 is a vertical section of the same, and

Figure 10 is a horizontal section of the upright and pulleys attached to the top thereof;

Figure 11 is a plan view of the top of the apparatus; and

Figure 12 is a side elevation partly in section of the shell clamping means.

Figure 1:
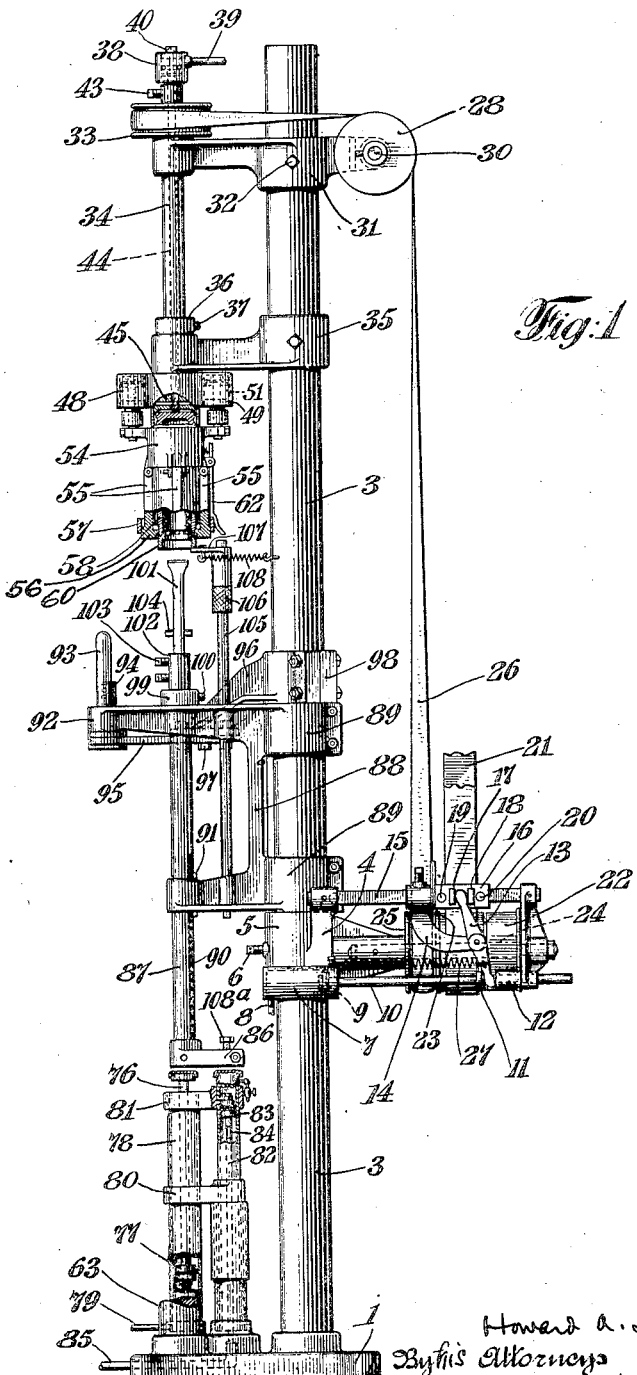

In the drawings I have shown a base 1 having a plurality of openings 2 to enable the same to be attached to any suitable support. Extending upwardly from the base 1 there is a main upright 3. Said upright 3 carries a belt shipper bracket 4 having a sleeve 5 located on the upright 3 and secured in place by a screw 6. On the sleeve 5 there is a cylinder 7 adapted to be supplied with compressed air by means of a pipe 8 to operate a piston 9 located therein, and attached to a rod 10 having stops 11 and 12 for operating a belt shipper lever 13 pivoted to an arm 14 supported upon a rod 15 located on the bracket 4. The lever 13 operates a carriage 16 which slides on the rod 15, said carriage having stops 17 and 18 to cooperate with the end of the lever 13 and having arms 19 and 20 to engage a driving belt 21 which is arranged to be shifted by the belt shipper from a driving pulley 22 to an idler pulley 23, both of which are loosely carried by a shaft 24 on the bracket 4. Fixedly secured to the driving pulley 22 there is provided a pulley 25 having a belt 26 passing over the same. A spring 27 normally operates to throw the belt 21 over the idler pulley 23 in opposition to the force of the compressed air in the cylinder 7.

The belt 26 passes upwardly over two idler pulleys 28 and 29, which are carried on a shaft 30 in a pulley bracket 31 located on the top of the main upright 3, said bracket being retained in place by means of a screw 32. On the bracket 31 there is supported a further pulley 33, around which the belt 26 passes, said pulley 33 being fixedly secured to a shaft 34 passing through said bracket 31. A further bracket 35 is provided on the upright 3, through which passes the shaft 34, and a collar 36 having an adjusting screw 37 surrounds the shaft 34 and retains it at the proper elevation. At the upper end of the shaft 34 there is a fixed housing 38 having connection by means of a pipe 39 with any suitable compressed air supply. A screw-threaded plug 40 is provided in the top of the housing 38. In said housing there is a fibre washer 41, so as to provide an air-tight joint between the shaft 34 and a flanged connecting nipple 42, which extends into the interior of the housing and is screw-threaded at its lower end to the upper end of the shaft 34, a screw 43 being provided for holding the nipple in place. The shaft 34 has a central passageway 44 for supplying compressed air to the interior of a bell 45 which acts as a work holder by means of transverse passageways 46 and 47, which communicate with cylinders 48 and 49 located in said bell 45. In the cylinders 48 and 49 there are pistons 50 and 51 which are connected by means of piston rods 52 and 53 to a sliding carriage 54 surrounding the lower portion of the bell 45, and having a plurality of spring-pressed arms 55 with inwardly directed flanges 56, which pass through a ring 57 attached to the lower end of the bell 45, so that upon the upward movement of the pistons 50 and 51 and the attached arms, the arms 55 will be forced towards the centre in opposition to the springs acting thereon, so as to maintain in place a projectile or shell 58 carrying a body of explosive 59 and having at its lower end an adapter frame 60 with peripheral recesses 61 engaging the body of explosive 59 to prevent the rotation of the same relative to the shell 58 during the drilling operation. It will be understood that the adapter frame 60 is in position on the shell 58 at the time the explosive 59 is cast therein, so that the recesses 61 are initially filled with explosive in such a way as to lock the explosive to the adapter frame 60 during the drilling operation. A spring-pressed catch 62 is attached to the carriage 54 so as to maintain the carriage in elevated position by engagement between the catch 62 and the ring 57, and thus retain the shell 58 in position if for any reason the supply of compressed air should be interrupted. On the base 1 there is, furthermore, provided a smaller upright 63 having thereon an adjustable collar 64 provided with screws 65 for maintaining it in adjusted position. Said collar 64, furthermore, carries a catch 66 normally pressed inwardly by a spring 67 so that the said catch engages with one of four recesses 68 in a disc 69 on a rotatable shell carriage 70, which acts as a shell transfer member to move shells to and from the work holder 45 and which is maintained in place at the right elevation on the upright 63 by means of a collar 71 having screws 72 located on the upright 63 above the shell carriage 70. The shell carriage 70 has two arms 73 constructed exactly alike, each of which comprises a recess 74 for receiving the shell 58, said recess 74 being located over a plunger 75 which extends upwardly through the bottom of the carriage 70 so that it can be engaged by a compressed-air-operated piston rod 76 attached to a piston 77 arranged to reciprocate in a cylinder 78 supported upon the base 1, and arranged to be supplied with compressed air by means of a pipe 79 from any suitable source of supply. Brackets 80 and 81 extend from the cylinder 78 to a drill-operating cylinder 82 which is arranged to be moved in opposition to a stationary piston 83, having a hollow piston rod 84 attached to the base 1 and provided with a supply of compressed air by means of a pipe 85. The movable cylinder 82 is provided to cooperate with and move upwardly an arm 86 attached to a drill-supporting rod 87 arranged to swing around the main upright 3 upon a bracket 88 having split sleeves 89 extending around the upright 3 and one of which rests upon the belt shipper bracket 4. The drill-supporting rod 87 has a groove 90 which cooperates with a projection 91 in the bracket 88 so as to permit vertical movement of the rod 87 relative to the bracket 88, but in such a manner as to prevent the relative rotation of these parts. On the bracket 88 there is furthermore provided an extension 92 having a handle 93 for rotating the same around the upright 3, said bracket 92 being provided furthermore with a spring-operated catch 94 to hold the drill in its operative position by cooperation with a flanged arm 95 attached to a fixed bracket 96 by means of bolts 97, said bracket 96 having a split sleeve 98 which surrounds the upright 3. Said bracket 96, furthermore, acts as a stop for the swinging bracket 88 when the drill is in its inoperative position by the spring-pressed catch 94 coming in contact with the side of said bracket 96. At its upper end, the drill supporting rod carries a collar 99 having a screw 100 for holding it in place so as to maintain the drill operating rod 87 at its proper elevation. Said rod 87 at its upper end carries a drill 101 in a socket 102 in said rod 87 in which it is held in position by means of screws 103. A cutter 104 is carried by the drill 101 so as to countersink the mouth of the hole drilled in the body of explosive 59 by means of the drill 101. In order to limit the upward movement of the drill 101 there is provided a rod 105 which is screw-threaded at its lower end to the swinging bracket 88, and which at its upper end has a knurled sleeve 106 fixed thereto and supporting above the same on the rod 105 a stop 107 having a spring 108 connecting it to the upright 3. The elevation of the stop 107 is adjusted by turning the rod 105 until the stop 107 is in contact with the lower edge of the adapter frame 60. The movement of the drill supporting rod 87 upwardly is limited by the lower end of the rod 105 coming in contact with an adjustable screw 108ª, located in the arm 86.

In the operation of my invention it will be assumed that the spring-pressed catch 94 is disengaged from the flanged arm 95 and that the swinging bracket 88 is moved to one side and rests against the side of the fixed bracket 96 on the main upright 3. In this position the drill supporting rod 87 will have been moved away from its position over the cylinder 78. It will also be assumed that the power has been thrown off by the releasing of compressed air from the cylinder 7 and the movement of the belt shipper through the agency of the spring 27, so as to bring the driving belt 21 over the idler pulley 23. It will also be assumed that the compressed air is removed from the cylinders 48 and 49 so that the arms 55 will have been moved downwardly into their lower position. A shell 58 is now inserted in the recess 74 in the shell carriage 70 and the shell carriage is swung on the upright 63 until the plunger 75 which underlies the shell 58 is over the cylinder 78. Compressed air is now admitted to the cylinder 78 which drives the piston rod 76 upwardly so as to elevate the plunger 75 and the shell 58 thereon until it has passed beyond the lower ends of the arms 55. Compressed air is then admitted through the pipe 39 thus elevating the arms 55 and forcing their lower ends inwardly until they grasp the lower end of the shell 58. The air is now exhausted from the cylinder 78, thus lowering the plunger 75, and the shell carriage 70 is thereafter rotated so as to move it away from its position over the piston 76. Compressed air is now applied to the cylinder 7, thus shifting the belt 21 over the pulley 22 and driving the belt 26 so as to rotate the shell 58. When this has been done the swinging bracket 88 is moved by the handle 93 so as to bring the arm 86 over the movable cylinder 82, and air is then admitted to the cylinder 82 so as to elevate the arm 86 and the drill supporting rod 87 attached thereto, thus elevating the drill 101 and cutter 104, until a hole of the desired depth is drilled in the body of explosive 59 located in the shell. During this operation, the cutter 104 countersinks the mouth of the hole formed by the drill 101. During the drilling operation the borings fall downwardly away from the shell 58 so that any possiblility of friction due to their accumulation around the drill is avoided. The depth of the hole drilled is controlled by screw 108ª and the rod 105, both of which may be adjusted, the adjusting of the relative distance between the rod 105 and the arm 86 determining the depth of the hole produced in the body of explosive 59. When the shell has been drilled in this manner, the air is released from the cylinder 82, thus lowering the drill 101. When the drill has been lowered, the spring pressed catch 94 is released from engagement with the arm 95 and the swinging bracket 88 is moved to one side by means of the handle 93, and until the carriage 88 comes into contact with the side of the fixed bracket 96. The shell carriage 70 is now swung beneath the shell 58, which is held in the arms 55, and compressed air is admitted to the cylinder 78 until the plunger 75 is beneath the shell. At the same time, the shell is brought to rest by shifting the belt 21 to the idler pulley 23 by the releasing of the air from the cylinder 7. The air is also released from the cylinders 48 and 49, thus allowing the arms 55 to fall by gravity so that the shell 58 is released by said arms, and rests upon the plunger 75. Air is gradually exhausted from the cylinder 78 thereby lowering the shell 58. The shell can now be removed, and other shells may be drilled in the same manner. The shell carriage 70 being provided with two of the arms 73 permits one of the arms to be used for removing the shell, while the other arm is being supplied with a shell for subsequent drilling by the machine.

While I have described my invention above in detail, I wish it to be understood that many changes may be made therein without departing from the spirit of my invention as defined in the appended claims.

I claim:

1. A drilling apparatus for shells comprising a shell elevating device, a shell holding device, a drill supporting means, and swinging arms for bringing first the shell elevating device and then the drill supporting means under the shell holding device.

2. A drilling apparatus for shells comprising a shell elevating device, a shell holding device, a drill supporting means, means to bring first the shell elevating device, and then the drill supporting means under the shell holding device, and compressed-air-operated mechanism for moving the shell elevating device and the drill operating means.

3. A drilling apparatus for shells comprising a shell elevating device, a shell holding device, a drill supporting means, and swinging arms for bringing first the shell elevating device and then the drill supporting means under the shell holding device, and compressed-air-operated mechanism for moving the shell elevating device and the drill operating means.

4. A drilling apparatus for shells comprising a shell elevating device, a shell holding device, a drill supporting means, means to bring first the shell elevating device then the drill supporting means under the shell holding device, compressed-air-operated cylinders and pistons for moving the shell elevating device and the drill operating means, said cylinders being located side by side, and the drill supporting means having an arm adapted to extend over its compressed-air-operated cylinder.

5. A drilling apparatus for shells comprising a shell elevating device, a shell holding device, a drill supporting means, means to bring first the shell elevating device then the drill supporting means under the shell holding device, compressed-air-operated cylinders and pistons for moving the shell elevating device and the drill operating means, said cylinders being located side by side, and the drill supporting means having an arm adapted to extend over its compressed-air-operated cylinder, but the cylinder for operating the shell elevating device being located directly beneath the shell holding device.

6. A drilling apparatus comprising a work holder for holding a shell in inverted position during the drilling operation, a drill located beneath said work holder, means for clamping the said shell in said work holder, a reciprocable shell transfer member adapted to be brought into and out of alinement with said work holder, and means for reciprocating said last-mentioned member to present a shell to the work holder.

7. A drilling apparatus comprising a work holder for holding a shell in inverted position during the drilling operation, a drill located beneath said work holder, a reciprocable shell transfer member also located below the work holder and movable into and out of a position in alinement with the work holder, and means for reciprocating said shell transfer member.

In testimony that I claim the foregoing I have hereunto set may hand.

HOWARD A. STILLWELL.

Witnesses:
NORMAN C. DOWNS,
W. S. WARD.